(12) United States Patent
Ide (10) Patent No.: US 6,522,839 B2
(45) Date of Patent: Feb. 18, 2003

(54) DISTANCE MEASURING DEVICE AND CAMERA HAVING THE SAME

(75) Inventor: Masataka Ide, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/898,419

(22) Filed: Jul. 3, 2001

(65) Prior Publication Data

US 2002/0006279 A1 Jan. 17, 2002

(30) Foreign Application Priority Data

Jul. 14, 2000 (JP) ......................................... 2000-215106

(51) Int. Cl.[7] ............................................... G03B 13/36
(52) U.S. Cl. ........................... 396/80; 396/92; 396/121
(58) Field of Search .............................. 396/79, 121, 80, 396/122, 123, 111, 89, 92, 91, 81; 356/3, 14; 250/201.2, 208.1, 559.38

(56) References Cited

U.S. PATENT DOCUMENTS 6,128,445 A  10/2000  Nakamura ................... 396/121
6,242,727 B1 * 6/2001 Nakamura ................ 250/201.2

FOREIGN PATENT DOCUMENTS

JP   11-153749   6/1999
JP   11-153751   6/1999

\* cited by examiner

Primary Examiner—W. B. Perkey
(74) Attorney, Agent, or Firm—Straub & Polotylo; John C. Pokotylo

(57) ABSTRACT

A distance measuring sensor applied to the present distance measuring device has three pairs of line sensors and a control circuit arranged in the center thereof. In three pairs of line sensors, the central line sensors have a train of photodetector units and a train of processing units, to be divided into two, for processing output signals of the train of photodetector units. The upper line sensors and lower line sensors are arranged on the upper and lower sides of the train of photodetector units on the right and left of the center line sensors, opposed to the train of processing units. The upper and lower line sensors have the train of photodetector units corresponding to a length of two-divided line-sensor.

32 Claims, 7 Drawing Sheets

DISTANCE MEASURING DEVICE AND CAMERA HAVING THE SAME

This application claims benefit of Japanese Application No.2000-215106 filed in Japan on Jul. 14, 2000, the contents of which are incorporated by this reference.

BACKGROUND OF THE INVENTION

1. Field of the Invention

The present invention relates to a distance measuring device, an optical sensor, and a camera, such as a film-based camera (silver-halide film camera) or a digital camera, having the distance measuring device.

2. Description of the Related Art

Conventionally, distance measuring devices use a distance measuring sensor provided with a plurality of pairs of line sensors to ensure the measurement of a distance to a subject. For example, one of the distance measuring devices can measure the distance within a wide range by providing distance measuring areas having a plurality of lines. In this distance measuring device, as a larger number of distance measuring areas are arranged corresponding to the line sensors, the subject can be certainly photographed, thereby improving the precision of distance measurement.

In the case of applying the above-mentioned distance measuring device to film-based cameras (silver-halide film cameras) having a zoom lens, there is a problem in that, inconveniently, a space between the distance measuring areas widens relatively to a size of a focal plane and a part of the distance measuring areas is out of the focal plane because even if the distance measuring areas are arranged within a wide range of the focal plane in the case of a low photographing magnification, an angle of view upon photographing is narrow when the a photographing magnification is increased.

Recently, compact size is required for film-based cameras (silver-halide film cameras) and digital cameras and, in association therewith, miniaturization is also required for the distance measuring device. Also, there is a problem in that the space between the distance measuring areas widens by using a distance measuring sensor having the same space between photodetector units even if a focal distance of a distance measuring optical system is reduced so as to miniaturize it.

Then, in order to solve the inconvenience of the above conventional distance measuring device, Japanese Unexamined Patent Application Publication No. 11-153751 proposes a distance measuring device in which a photodetector unit and a processing unit form an L-shaped pattern every pixel of a line sensor and a distance measuring sensor is composed of a train of the photodetector units and a train of the processing units to join the patterns of adjacent pixels to each other. In the case of a distance measuring area which is symmetrical in the vertical direction, the photodetector unit of the line sensor having the pattern is arranged to a symmetric axis of the distance measuring area.

However, even if applying the line sensor of the distance measuring device in the Japanese Unexamined Patent Application Publication No. 11-153751, inconveniently, the space between the distance measuring areas is much wider because the processing unit exists between the photodetector units.

Figure 15A:
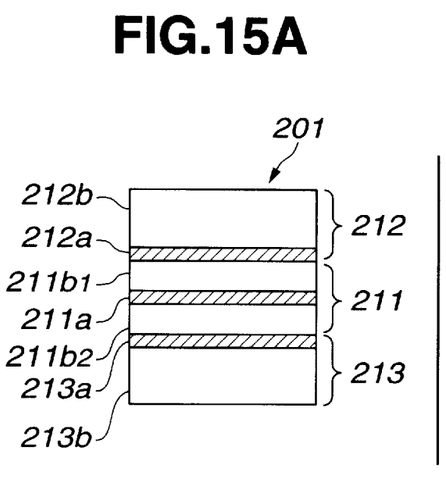
FIG. 15A is a diagram showing the arrangement of line sensors in one conventional distance measuring device.

FIG. 15A is a diagram showing the arrangement of the line sensor of the above distance measuring device. Referring to FIG. 15A, in the distance measuring device, a distance measuring sensor 201 comprises: a center line-sensor 211; an upper line-sensor 212; and a lower line-sensor 213. The center line sensor 211 comprises a train of photodetector units 211a and trains of processing units 211b$_1$ and 211b$_2$ which are arranged on upper and lower sides of the train of photodetector units 211a, respectively. The upper line-sensor 212 comprises a train of photodetector units 212a and a train of processing units 212b which is arranged on the upper side of the train of photodetector units 212a. The lower line-sensor 213 comprises a train of photodetector units 213a and a train of processing units 213b which is arranged on the lower side of the train of photodetector units 213a. As described above, the trains of processing units are provided between the trains of photodetector units, thus widening inter-trains of photodetector units.

It is considered that an IC process for manufacturing the distance measuring sensor is made fine to reduce the size of a processing circuit unit, thereby further reducing a space between the photodetector units. However, this method has a problem in that costs are increased and it is not appreciable to the cameras.

In a distance measuring device disclosed in Japanese Unexamined Patent Application Publication No. 11-153749, line sensors are arranged linear-symmetrically to an imaginary line, and trains of photodetector units are closer to the imaginary line, rather than trains of processing units. This arrangement causes a space between photodetector units to be narrow.

However, in the line sensors of the distance measuring device disclosed in the Japanese Unexamined Patent Application Publication No. 11-153749, inconveniently, a space of one part of photodetector units is much close thereto, a space of the other part is much wide, and the arrangement of the distance measuring areas becomes unbalanced.

Figure 15B:
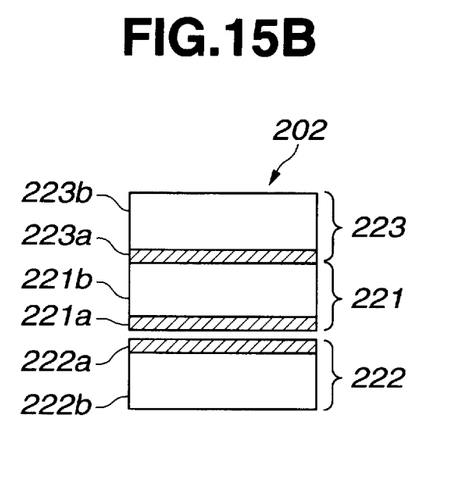
FIG. 15B is a diagram showing the arrangement of line sensors in another conventional distance measuring device.

FIG. 15B is a diagram showing the arrangement of the line sensors in the above distance measuring device. Referring to FIG. 15B, in the distance measuring device, a distance measuring sensor 202 comprises: a center line-sensor 221; a lower line-sensor 222; and an upper line-sensor 223. The center line-sensor 221 comprises a train of photodetector units 221a and a train of processing units 221b which is arranged on the upper side of the train of photodetector units 221a. The lower line-sensor 222 comprises a train of photodetector units 222a and a train of processing units 222b which is arranged on the lower side of the train of photodetector units 222a. The upper line-sensor 223 comprises a train of photodetector units 223a and a train of processing units 223b which is arranged on the upper side of the train of photodetector units 223a. As shown in FIG. 15B, the trains of photodetector units 221a and 222a are exceedingly close to each other, and the trains of photodetector units 221a and 223a are exceedingly far from each other., thus exhibiting the asymetry of the arrangement.

SUMMARY OF THE INVENTION

To solve the above-mentioned inconveniences, according to the present invention, it is one object of the present invention to provide a distance measuring device having a plurality of pairs of line sensors with low costs whereby the density of distance measuring areas can be sufficiently maintained if a photographing magnification is increased and if a distance measuring optical system is reduced in size, and a distance to a subject can be measured without fail by the proper arrangement of line sensors. Also, it is another object of the present invention to provide a camera incorporating the above-mentioned distance measuring device.

Further, it is another object of the present invention to provide an optical sensor having a plurality of pairs of line sensors whereby the density of a detecting area can be sufficiently maintained if a detecting magnification is increased and if the size is miniaturized, and accurate detection becomes possible by the proper arrangement of line sensors.

According to the present invention, there is provided a distance measuring device comprising: an optical system for dividing an image of a subject and forming the image; and a plurality of line sensors arranged substantially onto an image-forming plane of the optical system, each of which has a train of photodetector units composed of a plurality of pixels for receiving light of the subject image which passes through the optical system and a train of processing units for processing and outputting a charge generated in the train of photodetector units, wherein at least one of the plurality of line sensors divides the train of photodetector units into a plurality of blocks, of the train of processing units corresponding to each block, one part of train of processing units is arranged to one side of the train of photodetector units, and the other part of train of processing units is arranged to the other side to sandwiching the train of photodetector units.

Further, according to the present invention, there is provided an optical sensor comprising a plurality of line sensors, each of which comprises a train of photodetector units composed of a plurality of pixels for receiving light and a train of processing units for processing and outputting a charge generated in the train of photodetector units, wherein at least one of the plurality of line sensors divides the train of photodetector units into a plurality of blocks, each of the train of processing units corresponding to each block, one part of train of processing units is arranged to one side of the train of photodetector units, and the other part of train of processing units is arranged to the other side to sandwich the train of photodetector units.

Furthermore, according to the present invention, there is provided a camera having a distance measuring device, comprising: a photographing optical system; a drive unit for driving the photographing optical system in an optical axis direction; an image pickup unit for photographing an image of a subject which is formed through the photographing optical system; a distance measuring optical system for dividing and forming: the image of the subject; a plurality of line sensors arranged substantially onto an image forming plane of the distance measuring optical system, each of which comprises a train of photodetector units composed of a plurality of pixels for receiving light of the image of the subject which passes through the distance measuring optical system and a train of processing units for processing and outputting a charge generated in the train of photodetector units; and a control unit for controlling an operation of the drive unit based on outputs of the line sensors so that the image of the subject is formed onto a focal plane of the image pickup unit, wherein at least one of the plurality of line sensors divides the train of photodetector units into a plurality of blocks, of the train of processing units corresponding to each block, one part of train of processing units is arranged to one side of the train of photodetector units, and the other part of train of processing units is arranged to the other side to sandwich the train of photodetector units.

Further objects, features and advantages of the present invention will become apparent from the following description of the preferred embodiments with reference to the attached drawings.

DESCRIPTION OF THE PREFERRED EMBODIMENTS

Hereinbelow, embodiments of the present invention will be described with reference to the drawings.

Figure 1:
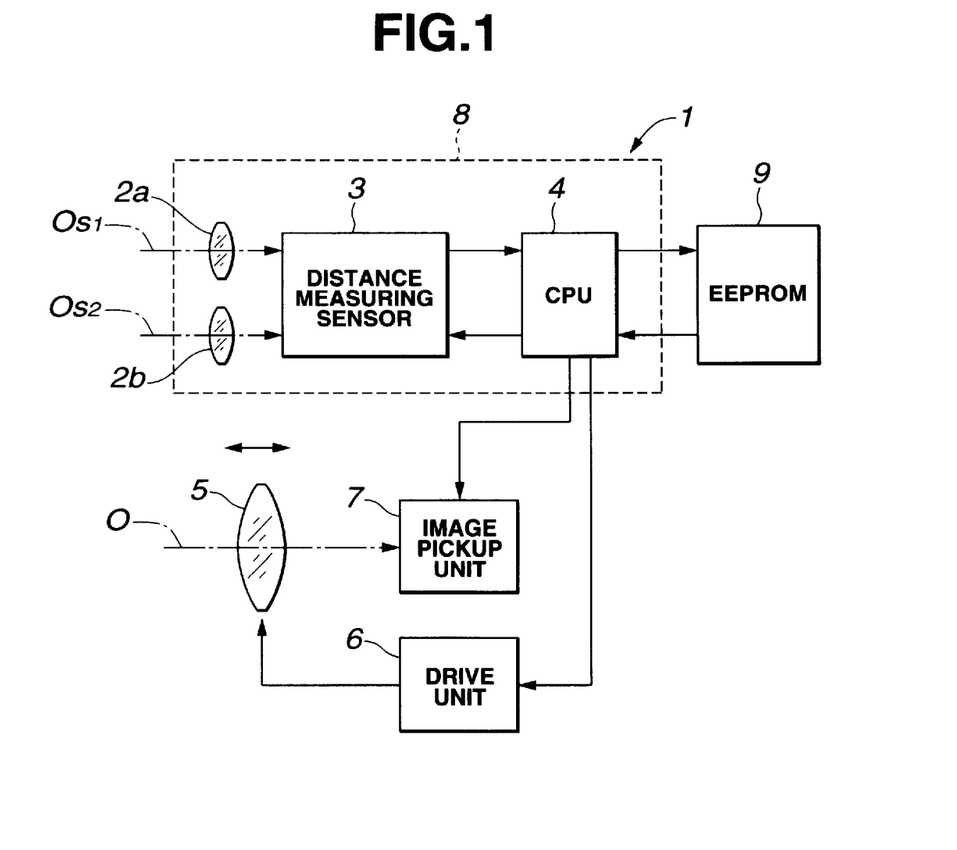
FIG. 1 is a block diagram showing main portions of an image pickup apparatus according to a first embodiment of the present invention.
Figure 2:
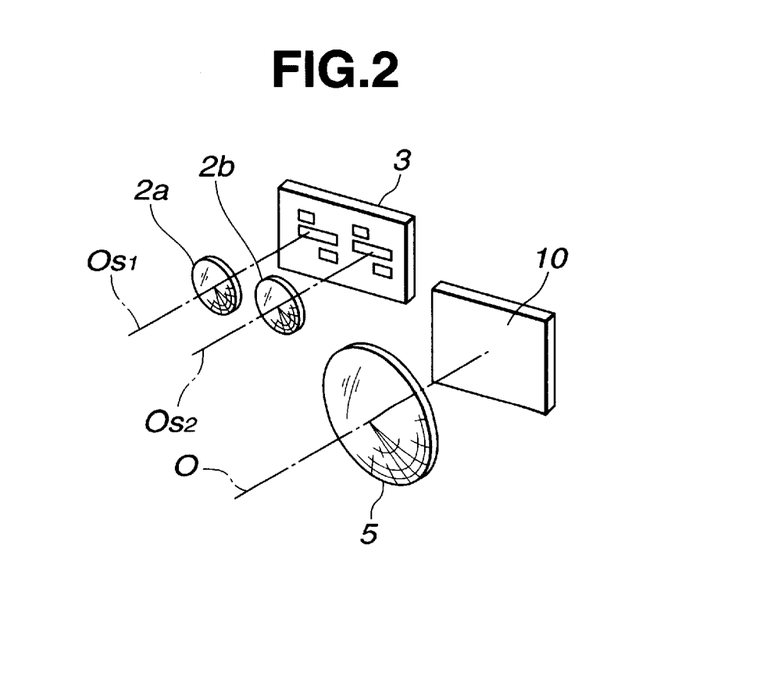
FIG. 2 is a perspective view of a photographing optical system and a distance measuring optical system in the image pickup apparatus in FIG. 1.
Figure 3:
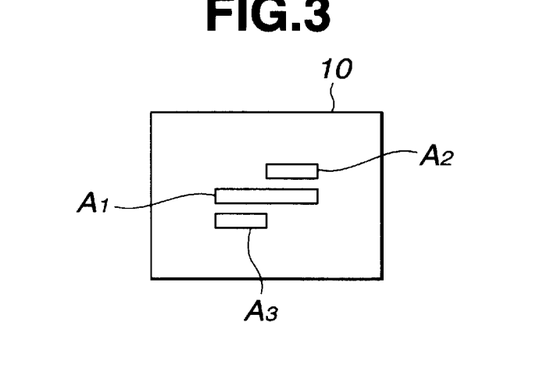
FIG. 3 is a diagram showing distance measuring areas on a focal plane in the image pickup apparatus in FIG. 1.
Figure 4:
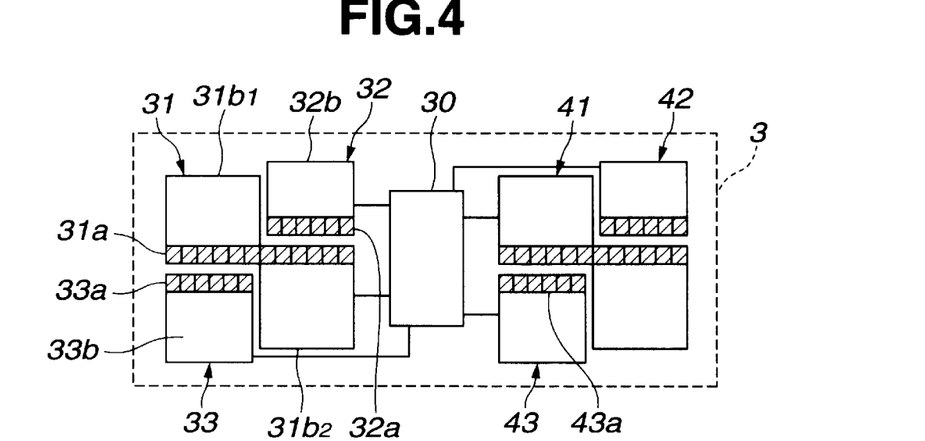
FIG. 4 is a diagram showing an internal arrangement of distance measuring sensors in the image pickup apparatus in FIG. 1.

FIG. 1 is a block diagram showing main portions of an image pickup apparatus having a distance measuring device in a first embodiment of the present invention; FIG. 2 is a perspective view of a photographing optical system and a distance measuring optical system in the image pickup apparatus in FIG. 1; FIG. 3 is a diagram showing distance measuring areas on a focal plane in the image pickup apparatus in FIG. 1; and FIG. 4 is a diagram showing an internal arrangement of distance measuring sensors in the image pickup apparatus in FIG. 1.

An image pickup apparatus 1 is applied to, for example, a film-based camera (silver-halide film camera). In the image pickup apparatus 1, as shown in FIG. 1, an image of a subject is formed onto a focal plane 10 of an image pickup unit (image pickup means) 7 such as a silver-halide film through an image pickup optical system 5 having an optical axis O, and photographing is performed. A distance to the subject is measured and detected by a distance measuring device 8. Based on the detected information on the distance to the subject, a CPU (control means) 4 moves the image pickup optical system 5 in the optical axis direction through a drive unit (driving means) 6 comprising a motor, etc., thereby driving automatic focusing.

Incidentally, the image pickup apparatus 1 can be applied to a digital camera. In this case, the image pickup unit forms an image pickup apparatus incorporating an image pickup element.

The distance measuring device 8 having optical axes $O_{S1}$ and $O_{S2}$ comprises: a pair of distance measuring optical systems 2a and 2b arranged in parallel therewith; a distance measuring sensor 3 as an optical sensor; and the CPU 4 as the control unit. The distance measuring sensor 3 has a plurality of pairs of line sensors for receiving light beams of the subject from the distance measuring optical systems 2a and 2b. The CPU 4 calculates the distance to the subject based on an output signal from the distance measuring sensor 3 and, as the calculated result, controls the automatic focusing of the image pickup optical system 5.

Further, an EEPROM 9 is connected to the distance measuring device 8. The EEPROM 9 is a nonvolatile memory and stores, in advance, correction data, etc. upon distance measurement.

The distance measuring sensor 3 is a CMOS sensor, and comprises: three pairs of line sensors 31 and 41, 32 and 42, and 33 and 43 arranged at positions on the image forming plane of the distance measuring optical systems 2a and 2b corresponding to distance measuring areas, which will be described later; and a control circuit 30 arranged in a space among the pairs of line sensors 31 to 33 and 41 to 43.

As shown in FIG. 3, three lines of distance measuring areas $A_1$ to $A_3$ are set on the focal plane 10. On the focal plane 10, the distance measuring area $A_1$ is arranged in the center, the distance measuring area $A_2$ is arranged on the upper right of the distance measuring area $A_1$, and the distance measuring area $A_3$ is arranged on the lower left of the distance measuring area $A_1$.

The structure of: the distance measuring sensor 3 will be described in detail with reference to FIG. 4. Incidentally, the arrangement in FIG. 4 is shown corresponding to the distance measuring areas $A_1$ to $A_3$ shown in FIG. 3 for the sake of apparent understanding. Actual line sensors are arranged by vertically inverting the line sensors in FIG. 4. Also, the arrangement of the line sensors is described with reference to FIG. 4.

The distance measuring sensor 3 comprises three pairs of: line sensors 31 and 41 corresponding to the distance measuring area $A_1$ in the center; line sensors 32 and 42 corresponding to the distance measuring area $A_2$ on the upper right; and line sensors 33 and 43 corresponding to the distance measuring area $A_3$ on the lower left.

The line sensors 31, 32, and 33, each of which is the one line sensor of the pairs, comprise: trains of photodetector units 31a, 32a, and 33a having photodetector elements, composed of a plurality of pixels, for receiving light of the image of the subject; and trains of processing units $31b_1$, $31b_2$, 32b, and 33b for processing and outputting charges generated in the trains of photodetector units 31a to 33a, respectively. Similarly, the line sensors 41, 42, and 43, each of which is the other line sensor of the pairs, comprise trains of photodetector units and trains of processing units, respectively, and have the above-described arrangements. Then, the trains of photodetector units are formed by arranging the plurality of photodetector elements corresponding to the pixels, and the photodetector elements are photodiodes.

A detailed description is given of the arrangement of the line sensors 31. to 33 and 41 to 43. The line sensor 31 comprises: the train of photodetector units 31a in the center; and the trains of processing units $31b_1$ and $31b_2$ as two divided blocks on the right and left. The train of photodetector units 31a is also divided into two blocks in the above manner, corresponding to the trains of processing units $31b_1$ and $31b_2$. The train of processing units $31b_1$ as the half on the left is arranged on the upper side of the train of photodetector units 31a, and the train of processing units $31b_2$ as the half on the right is arranged on the lower side of the train of photodetector units 31a.

The line sensor 32 comprises: the train of photodetector units 32a; and the train of processing units 32b, which have lengths corresponding to ones of the two-divided train of photodetector units and the train of processing units of the line sensors 31. The train of photodetector units 32a is arranged above the train of photodetector units 31a (on the opposed side of the train of processing units $31b_2$). The train of processing units 32b is arranged on the upper side of the train of photodetector units 32a (on the opposed side of the train of photodetector units 31a). The train of processing units or the like is not interposed between the trains of photodetector units 31a and 32a and both trains 31a and 32a can be disposed apart from each other by a desired distance.

The line sensor 33 comprises: the train of photodetector units 33a; and the train of processing units 33b, which have lengths corresponding to ones of the train of photodetector units and the train of processing units as the two-divided trains of the line sensors 31. The train, of photodetector units 33a is arranged below the train of photodetector units 31a (on the opposed side of the train of processing units $31b_1$). The train of processing units 33b is arranged on the lower side of the train of photodetector units 33a (on the opposed side of the train of photodetector units 31a). The train of processing units or the like is not interposed between the trains of photodetector units 31a and 33a and both trains 31a and 33a can be disposed apart from each other by a desired distance.

Since the trains of photodetector units in the three pairs of line sensors are arranged in the above state, a space between the trains of photodetector units can be set to be desiredly small and the distance measuring areas can be arranged at the proper balanced positions. In addition, the number of photodetector units can be reduced, thus reducing the calculation time and reading time of the CPU 4.

Figure 5:
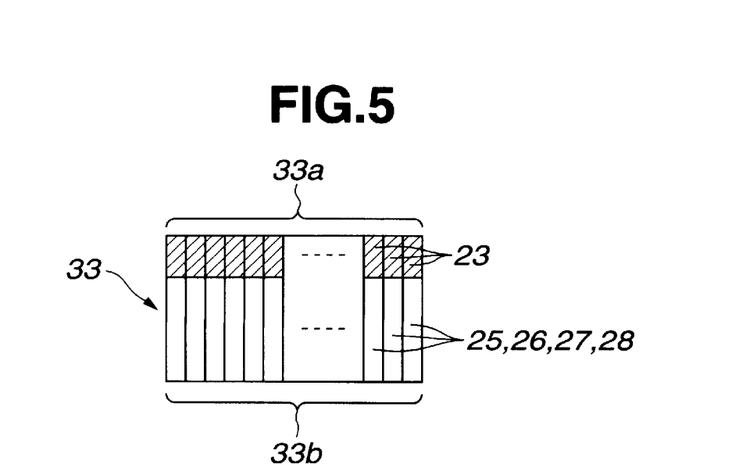
FIG. 5 is a diagram showing the arrangement of pixels of a train of photodetector units and a train of processing units in a line sensor in the image pickup apparatus in FIG. 1.
Figure 6:
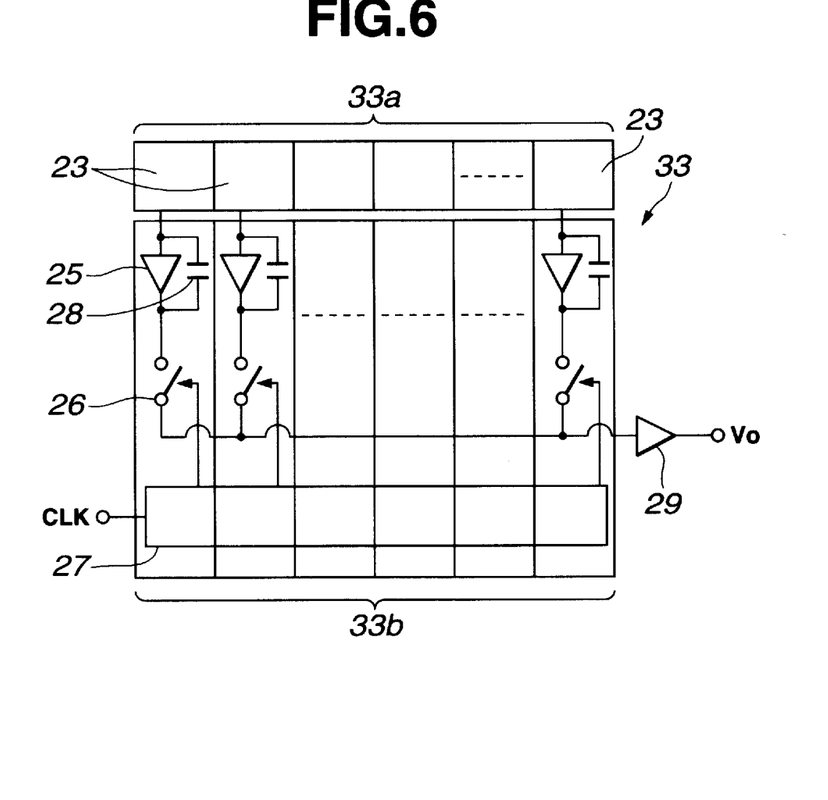
FIG. 6 is a diagram showing the structure of a circuit of the line sensor in the image pickup apparatus in FIG. 1.

Herein, a description is given of the structure and operation for circuits of the trains of photodetector units and the trains of processing units of the line sensor in the case of the line sensor 33 with reference to FIGS. 5 and 6. FIG. 5 is a diagram showing the structure of the pixels of the trains of photodetector units and the trains of processing units of the line sensor 33, and FIG. 6 is a diagram showing the structure of circuits in FIG. 5.

The train of photodetector units 33a of the line sensor 33 comprises a plurality of photodetector element 23 composed of photodiodes. The train of processing units 33b of the line sensor 33 comprises processing circuits and a single output circuit 29. Each processing circuit comprise: an amplifier 25; a storage unit 28; a switch 26; and a shift register 27, corresponding to each photodetector element 23.

In the line sensor 33, charges are generated by photodetection of the photodetecting elements 23 forming the train of photodetector units 33a. The generated charges are stored in the storage unit 28 in the amplifier 25 every pixel. The control circuit 30 inputs a read clock signal CLK to the shift register 27, thus sequentially switching on the switch 26 every pixel. Outputs obtained by converting the stored charges into voltage signals by the amplifiers 25 are sequentially outputted through the output circuit 29.

As a result, the output circuit 29 sequentially outputs the stored signal every pixel as a signal voltage $V_o$ through the distance measuring sensor 3, and the signal is inputted to the CPU 4 (refer to FIG. 1). In the CPU 4, the distance to the subject is obtained by calculation to which the principle of triangulation is applied, based on the signal from the distance measuring sensor 3.

Figure 7:
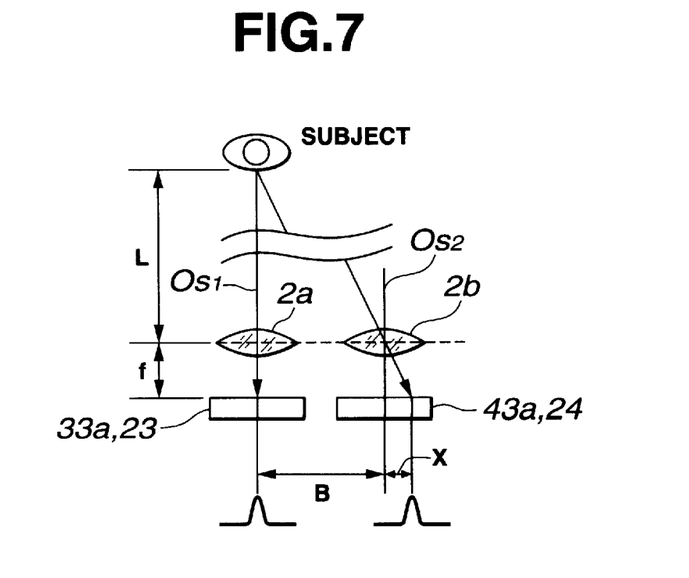
FIG. 7 is a diagram of an optical path for distance measurement in a distance measuring device in the image pickup apparatus in FIG. 1.

More specifically, as shown in the diagram of a distance measuring light path in the distance measuring device 8 in FIG. 7, reference symbol B denotes a base length as a space between the distance measuring optical systems 2a and 2b, f denotes a focal distance of the distance measuring optical systems 2a and 2b; L denotes a distance to a subject; and (B+x) denotes a space between the images of the subject on the pair of line sensors. A relational equation is given below.

$$L = B \cdot f / x \ldots \quad (1)$$

The distance to the subject L is obtained based on the equation (1).

Upon distance measurement, the CPU 4 selects one pair of line sensor on the right and left based on the signals from the plurality of line sensors, and the space between images of subject is obtained on the distance measuring sensor 3. Incidentally, FIG. 7 shows a status in which the one pair of line sensors 33 and 43 is selected and the images of the subject are formed on the one pair of trains of photodetector units 33a and 43a.

The relationship between the distance to the subject and the space between the images of the subject are controlled depending on the distance measuring device and is stored in the EEPROM 9 in advance. The CPU 4 reads out information on the space stored in the EEPROM 9 upon measuring the distance, and obtains the distance to the subject L based on the information.

If the images of the subject are obtained by the plurality of line sensors, the CPU 4 determines the distance to the subject L by the outputs of the line sensors, processes the calculation result based on predetermined algorithm, thereby obtaining a determinate distance to the subject L which is employed to the photographing.

The distance measuring sensor 3 may be a device other than the CMOS sensor, e.g., a device comprising photodetector means such as a CCD.

As described above, in the distance measuring device 8 of the first embodiment, as compared with the single distance-measuring areas arranged at predetermined spaces in the conventional manner, the line sensor 31 comprising the train of photodetector units and the train of processing units as a plurality of divided blocks is arranged in the center and other line sensors corresponding to the divided blocks are arranged oh the upper and lower side of the line sensor 31. Hence, the distance measuring areas can be two-dimensionally arranged at narrower spaces, that is, with high density. Also, since the number of pixels of the distance measuring sensors can be reduced, the calculation time for measuring the distance can be reduced in the CPU 4.

As compared with the conventional arrangement of the line sensors shown in FIG. 15A, in the distance measuring device 8 in the first embodiment of the present invention, the space between the trains of photodetector units can be small. Even if the photographing magnification is high, the distance measuring areas cannot be out of the focal plane. Simultaneously, as compared with the conventional arrangement of the line sensors shown in FIG. 15B, in the distance measuring device 8, all spaces between the trains of photodetector units can be small and the number of distance measuring areas can be increased in the up and down directions.

Next, a description is given of a distance measuring device according to a second embodiment of the present invention.

According to the second embodiment, the distance measuring device is integrated in an image pickup apparatus substantially similar to the image pickup apparatus 1 having therein the distance measuring device of the first embodiment shown in FIG. 1. On the contrary, according to the second embodiment, the distance measuring device has an arrangement of the distance measuring sensors, as optical sensors, different from that in the first embodiment and, accordingly, distance measuring areas are different from ones in the first embodiment.

Figure 8:
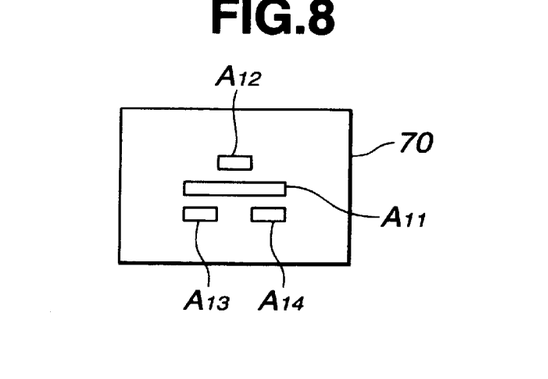
FIG. 8 is a diagram showing distance measuring areas on a focal plane in an image pickup apparatus according to a second embodiment of the present invention.

FIG. 8 is a diagram showing the distance measuring areas of a focal plane 70 in the image pickup apparatus to which the distance measuring device of the second embodiment is applied. As shown in FIG. 8, the focal plane 70 has therein four lines of distance measuring areas $A_{11}$ to $A_{14}$. The distance measuring area $A_{11}$ is arranged in the center of the focal plane 70, the distance measuring area $A_{12}$ is arranged above and adjacent to a center part of the distance measuring area $A_{11}$, the distance measuring area $A_{13}$ is arranged below and adjacent to a left part of the distance measuring area $A_{11}$, and the distance measuring area $A_{14}$ is arranged below and adjacent to a right part of the distance measuring area $A_{11}$.

Figure 9:
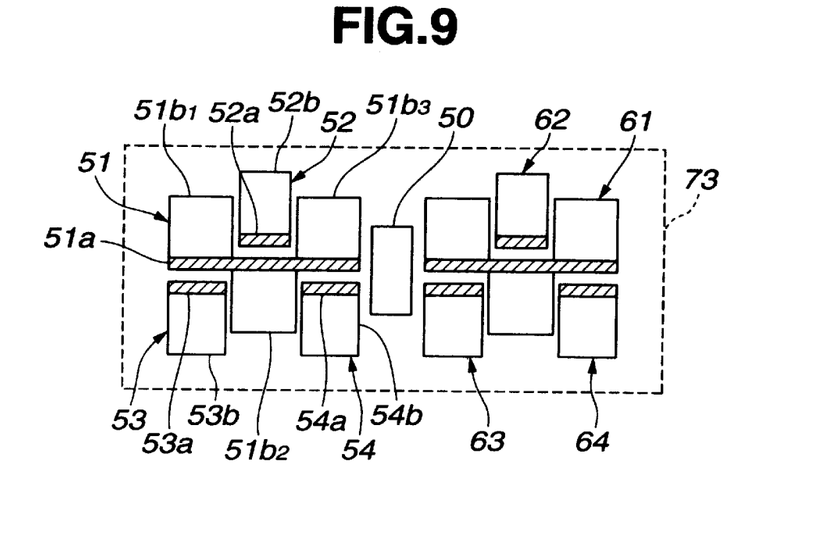
FIG. 9 is a diagram showing an internal arrangement of distance measuring sensors which are applied to the image pickup apparatus in FIG. 8.

FIG. 9 shows an internal arrangement of a distance measuring sensor 73 in the above distance measuring device. For the sake of clear understanding, the arrangement in FIG. 9 corresponds to the distance measuring areas $A_{11}$ to $A_{14}$ shown in FIG. 8. However, actual line sensors are arranged by vertically inverting the above-mentioned line sensors in FIG. 9. A description of the arrangement of the line sensors is given with reference to FIG. 9.

The distance measuring sensor 73 comprises: four pairs of line sensors—51 and 61 corresponding to the distance measuring area $A_{11}$; line sensors 52 and 62 corresponding to the distance measuring $A_{12}$; line sensors 53 and 63 corresponding to the, distance measuring area $A_{13}$; and line sensors 54 and 64 corresponding to the distance measuring area $A_{14}$; and a control circuit 50 arranged in the center of the four pairs of line sensors. The line sensors 51 to 54 and 61 to 64 comprise trains of photodetector units, composed of a plurality of pixels, for receiving light of an image of a subject and trains of processing units for processing and outputting optical charges generated in the trains of photodetector units, respectively.

The line sensor 51 comprises: a train of photodetector units 51a arranged in the center corresponding to the distance measuring area All in the center of the focal plane 70; and trains of processing units $51b_1$, $51b_2$, and $51b_3$ as three divided blocks. The train of photodetector units 51a corresponds to the train of processing units and, therefore, is also divided into three blocks.

The train of processing units $51b_1$, is arranged on the upper left of the train of photodetector units $51a$. The train of processing units $51b_2$ is arranged in the lower center of the train of photodetector units $51a$. The train of processing units $51b_3$ is arranged on the upper right of the train of photodetector units $51a$.

The line sensor 52 comprises: a train of photodetector units $52a$; and a train of processing units $52b$ arranged on the upper side of the train of photodetector units $52a$. The train of photodetector units $52a$ is arranged in the upper center of the train of photodetector units $51a$ (on the opposed side of the train of processing units $51b_2$), corresponds to the distance measuring area $A_{12}$, and it has a divided length of the line sensor. The train of processing units or the like is not interposed between the trains of photodetector units $51a$ and $52a$, and both the trains $51a$ and $52a$ can exist apart from each other by a desired distance.

The line sensor 53 comprises: a train of photodetector units $53a$; and a train of processing units $53b$ arranged on the lower side of the train of photodetector units $53a$. The train of photodetector units $53a$ is arranged below and adjacent to a left part of the train of photodetector units $51a$ (on the opposed side of the train of processing units $51b_1$), corresponds to the distance measuring area $A_{13}$, and it has the divided length of the line sensor. The train of processing units or the like is not interposed between the trains of photodetector units $51a$ and $53a$, and both the trains $51a$ and $53a$ can exist apart from each other by a desired distance.

The line sensor 54 comprises: a train of photodetector units $54a$; and a train of processing units $54b$ arranged on the lower side of the train of photodetector units $54a$. The train of photodetector units $54a$ is arranged below and adjacent to a right part of the train of photodetector units $51a$ (on the opposed side of the train of processing units $51b_3$), corresponds to the distance measuring area $A_{14}$, and it has the divided length of the line sensor. The train of processing units or the like is not interposed between the trains of photodetector units $51a$ and $54a$, and both the trains $51a$ and $54a$ can exist apart from each other by a desired distance.

Incidentally, the structure and the arrangement of the line sensors 61, 62, 63, and 64, serving as the pairs of the line sensors 51, is similar to those of the line sensors 51, 52, 53, and 54, respectively.

As described above, according to the second embodiment, in the distance measuring sensor 73 in the distance measuring device, of the trains of photodetector units of the four pairs of line sensors, the train of photodetector units of the line sensor 51 divided into blocks in FIG. 9 is arranged in the center and the other trains of photodetector units are vertically arranged corresponding to the divided blocks. Therefore, the space between the trains of photodetector units can be set to be desiredly small. Also, the number of pixels of the trains of photodetector units can be reduced, thus reducing the calculation time and reading time in the CPU 4. In addition, the distance measuring areas can be arranged at the proper balanced positions.

Moreover, as compared with the distance measuring area having a single shape, arranged at predetermined spaces in the conventional manner, the distance measuring areas can be two-dimensionally arranged at narrower spaces, that is, with high density. In addition, time-lag due to the distance measurement can be reduced.

Further, as compared with the conventional arrangement of the line sensors shown in FIG. 15A, in the image pickup apparatus to which the distance measuring device of the second embodiment is applied, the space between the trains of photodetector units can be smaller and the distance measuring areas cannot be out of the focal plane even if the photographing magnification is high. Also, as compared with the conventional arrangement of the line sensors shown in FIG. 15B, in the image pickup apparatus of the second embodiment, all spaces between the trains of photodetector units can be narrow and the number of distance measuring areas can be increased in the up and down directions.

Next, a description is given of a distance measuring device according to a third embodiment of the present invention.

According to the third embodiment, the distance measuring device is integrated in an image pickup apparatus substantially similar to the image pickup apparatus 1 having therein the distance measuring device of to the first embodiment shown in FIG. 1. On the contrary, according to the third embodiment, a photographing optical system can be zoomed, the distance measuring device has an arrangement of the distance measuring sensors, as optical sensors, different from that in the first embodiment and, accordingly, distance measuring areas on the focal plane are switched depending on zoomed statuses.

Figure 10A:
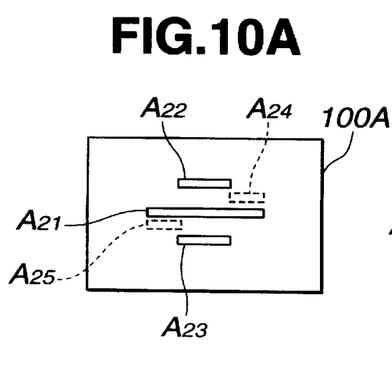
FIG. 10A is a diagram showing distance measuring areas on a focal plane in a wide-zoomed status of zoomed ones in an image pickup apparatus according to a third embodiment of the present invention.
Figure 10B:
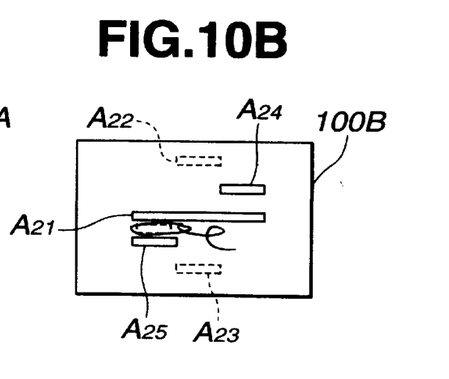
FIG. 10B is a showing distance measuring areas on a focal plane in a tele-zoomed status of the zoomed ones in the image pickup apparatus in FIG. 10A according to the third embodiment of the present invention.

FIGS. 10A and 10B are diagrams showing the distance measuring areas on the focal plane in zoomed statuses in the image pickup apparatus to which the distance measuring device of the third embodiment is applied, in which FIG. 10A shows the distance measuring areas when the photographing optical system is wide-zoomed, and FIG. 10B shows the distance measuring areas when the photographing optical system is tele-zoomed.

On a focal plane 100A in the wide-zoomed status in FIG. 10A and a tele-zoomed focal plane 100B in FIG. 10B are set all five lines of distance measuring areas $A_{21}$, $A_{22}$, $A_{23}$, $A_{24}$, and $A_{25}$. The five distance measuring areas $A_{21}$ to $A_{25}$ are selected by switching zoomed statuses.

That is, on the focal plane 100A in the wide-zoomed status, are selected the distance measuring area $A_{21}$ in the center, distance measuring area $A_{22}$ in the upper center of the area $A_{21}$, and distance measuring area $A_{23}$ having the same distance spaced from the area $A_{21}$ as that of the area $A_{22}$, in the lower center of the area $A_{21}$. Since the distance measuring area $A_{24}$ on the upper right and the distance measuring area $A_{25}$ on the lower left are close to both right and left ends of the focal plane 100A and are greatly nearby the center distance measuring area $A_{21}$, both the areas $A_{24}$ and $A_{25}$ are not effective as the distance measuring areas and also are not used as the distance-measuring areas in the wide-zoomed status, thereby preventing the degradation in precision of measuring the distance to a main subject.

On the focal plane 100B in the tele-zoomed status are selected the distance measuring area $A_{21}$ in the center, distance measuring area $A_{24}$ on the upper right of the area $A_{21}$, and distance measuring area $A_{25}$ having the same distance spaced from the area $A_{21}$ as that of the area $A_{24}$, on the lower left of the area $A_{21}$. Since the distance measuring area $A_{22}$ in the upper center and the distance measuring area $A_{23}$ in the lower center are close to both top and bottom ends of the focal plane 100B and are arranged to capture subjects excluding the main subject, both the areas $A_{22}$ and $A_{23}$ are not effective. as the distance measuring areas and also are not used as the distance measuring areas in the tele-zoomed status, thereby preventing the degradation in precision of measuring the distance to the main subject.

As described above, the distance measuring area is set by switching the focal plane to one in FIG. 10A or 10B in accordance with the zoomed statuses of the photographing optical system. Consequently, the precision of measuring the distance to the subject is not reduced depending on the zoomed statuses.

Figure 11:
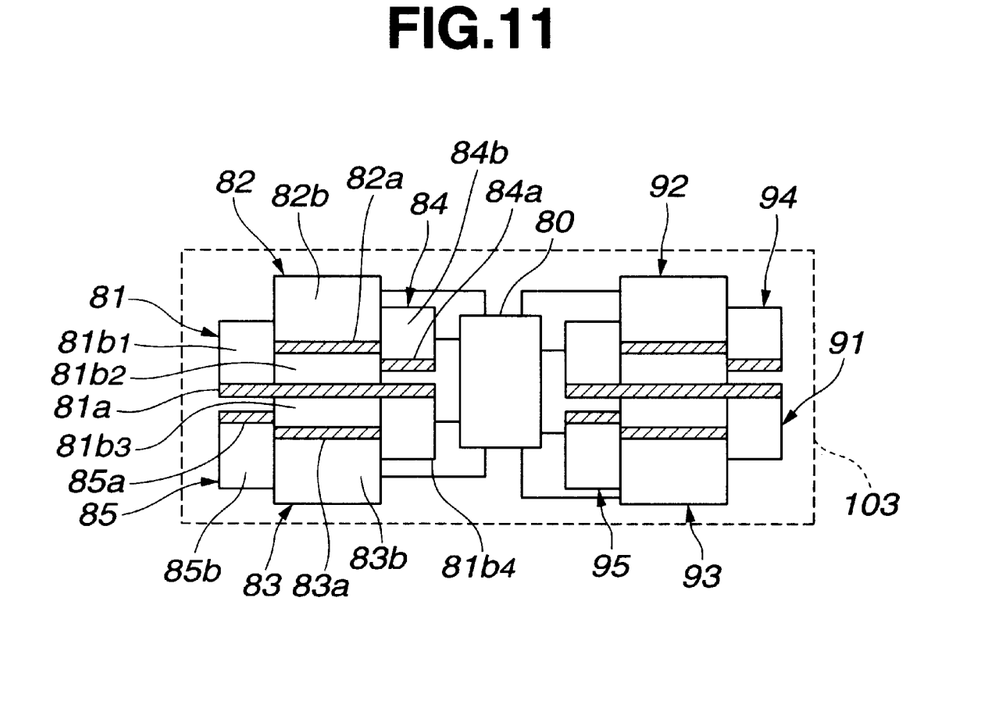
FIG. 11 is a diagram showing an internal arrangement of distance measuring sensors which are applied to the image pickup apparatus in FIGS. 10A and 10B.

Next, a description is given of the configuration of the distance measuring sensor 103 in the distance measuring device of the third embodiment by using the internal arrangement of a distance measuring sensor in FIG. 11. For the sake of clear understanding, the arrangement in FIG. 11 corresponds to the distance measuring areas $A_{21}$ to $A_{25}$ shown in FIGS. 10A and 10B. However, actual line sensors are arranged by vertically inverting the above-mentioned line sensors in FIG. 11. A description of the arrangement of the line sensors is given with reference to FIG. 11.

The distance measuring sensor 103 comprises: five pairs of line sensors 81 and 91 corresponding to the distance measuring area $A_{21}$, 82 and 92 corresponding to the distance measuring $A_{22}$, 83 and 93 corresponding to the distance measuring area $A_{23}$, 84 and 94 corresponding to the distance measuring area $A_{24}$, and 85 and 95 corresponding to the distance measuring area $A_{25}$; and a control circuit 80 arranged in a space in the center of the five pairs of line sensors. The line sensors 81 to 85 and 91 to 95 comprise trains of photodetector units, composed of a plurality of pixels, for receiving light of the image of the subject and trains of processing units for processing and outputting optical charges generated in the trains of photodetector units, respectively.

The line sensor 81 comprises: a train of photodetector units 81a; and trains of processing units $81b_1$ to $81b_4$ as four divided blocks, arranged in the center corresponding to the distance measuring area $A_{21}$ in the center of the focal plane. The train oft photodetector units 81a corresponds to the divided trains of processing units and, therefore, is also divided into four blocks.

In the line sensor 81, the trains of processing units $81b_1$ and $81b_4$ are arranged to the upper left or lower right, respectively, of the train of photodetector units 81a, and the trains of processing units $81b_2$ and $81b_3$ are arranged to the upper center and lower center, respectively, of the train of photodetector units 81a.

Figure 12:
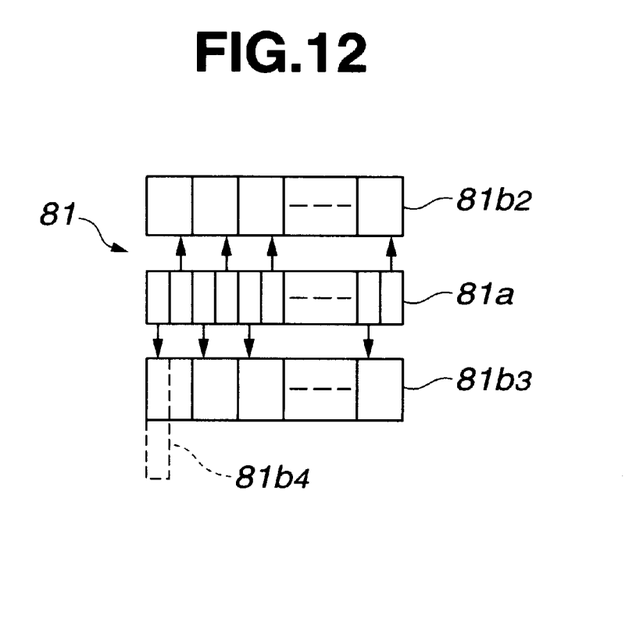
FIG. 12 is an enlarged view of a line sensor in the distance measuring sensor which is applied to the image pickup apparatus in FIGS. 10A and 10B.

Incidentally, the arrangement of the pixels of the train of photodetector units 81a and the trains of processing units $81b_2$ and $81b_3$ is formed by alternately sandwiching the train of photodetector units 81a between the trains of processing units $81b_2$ and $81b_3$ to face every other pixel of the train of photodetector units 81a, as shown in a partial enlarged view of the line sensor 81 in FIG. 12. This arrangement causes an occupied space in the vertical direction of the trains of processing units $81b_2$ and $81b_3$ to be reduced. In other words, the lengths of the trains of processing units $81b_2$ and $81b_3$ are approximately half of the lengths of the trains of processing units 81b, and $81b_4$ arranged only on one side of the train of photodetectors 81a. On the upper and lower outer-sides of the trains of processing units $81b_2$ and $81b_3$, the train of photodetector units of the line sensor 82 is separated from that of the line sensor 83 by a proper distance.

The line sensor 82 comprises: a train of photodetector units 82a; and a train of processing units 82b, arranged corresponding to the distance measuring area $A_{22}$ in the upper center of the focal plane. The train of photodetector units 82a has a length corresponding to a divided one of the train of processing units 81 and comes into contact with the divided train of processing units $81b_2$ in the upper center of the line sensor 81. The train of processing units 82b is arranged on the upper side of the train of photodetector units 82a.

A spaced distance between the trains of photodetector units 81a and 82a is longer than that between the trains of photodetector units 81a and 84a, which will be described later, and is determined by a height of the train of processing units $81b_2$. By setting a predetermined spaced distance, the distance measuring areas can be properly arranged on the focal plane when the focal distance of the photographing optical system is wide-zoomed.

The line sensor 83 comprises: a train of photodetector units 83a; and a train of processing units 83b, arranged corresponding to the distance measuring area $A_{23}$ in the lower center of the focal plane. The train of photodetector units 83a has a length corresponding to a divided one of the train of processing units 81 and comes into contact with the divided train of processing units $81b_3$ in the lower center of the line sensor 81. The train of processing units 83b is arranged on the lower side of the train of photodetector units 83a.

A spaced distance between the trains of photodetector units 81a and 83a is longer than that between the trains of photodetector units 81a and 85a, which will be described later, and is determined by a height of the train of processing units $81b_3$. By setting a predetermined spaced distance, the distance measuring areas can be properly arranged on the focal plane when the focal distance of the photographing optical system is wide-zoomed.

The line sensor 84 comprises: a train of photodetector units 84a; and a train of processing units 84b, arranged corresponding to the distance measuring area $A_{24}$ in the upper right of the focal plane. The train of photodetector units 84a has a length corresponding to a divided one of the train of processing units 81 and is arranged to the upper right of the train of photodetector units 81a within a range of the divided train of processing units $81b_4$ in the line sensor 81. The train of processing units 84b is arranged on the upper side of the train of photodetector units 84a. A spaced distance between the trains photodetector units 81a and 84a can be desiredly shorter because there is not a train of processing units, etc., interposed. By setting the predetermined spaced distance, the distance measuring areas can be properly arranged on the focal plane when the focal distance of the photographing optical system is tele-zoomed.

The line sensor 85 comprises: a train of photodetector units 85a; and a train of processing units 85b, arranged corresponding to the distance measuring area $A_{25}$ in the upper right of the focal plane. The train of photodetector units 85a has a length corresponding to a divided one of the train of processing units 81 and is arranged to the lower left of the train of photodetector units 81a within a range of the divided train of processing units $81b_1$ in the line sensor 81. The train of processing units 85b is arranged on the lower side of the train of photodetector units 85a. A spaced distance between the trains photodetector units 81a and 85a can be desiredly shorter because there is not a train of processing units, etc., interposed. By setting the predetermined spaced distance, the distance measuring areas can be properly arranged on the focal plane when the focal distance of the photographing optical system is tele-zoomed.

As described above, in the distance measuring device of the third embodiment, of the plurality of line sensors, the center line sensor 81 is provided with the train of processing units which is divided into four blocks on both sides of the train of photodetector units. The trains of photodetector units of other line sensors, corresponding to the divided blocks of the line sensor 81, are arranged to the block-divided trains of photodetector units at the positions opposed to the trains of processing units. The space of the trains. of photodetector units is varied depending on the block. Consequently, the line sensor, that is, distance measuring areas to be used, can be switched in accordance with the zoomed position of the photographing lens, and the distance measurement can be efficiently performed without deterioration in precision thereof.

As compared with the conventional distance measuring device in which the arrangement of the line sensors having a single length, the number of distance measuring areas can be reduced while ensuring the precision of distance measurement. Further, the number of pixels of the distance measuring sensor is decreased, a time for calculation of distance measurement is reduced in the CPU 4, and the automatic focusing process is fast, thereby improving the convenience.

Furthermore, as compared with the conventional distance measuring device in which the line sensors having a single length are arranged on the upper and lower sides, except for the center line sensor 81, the line sensors having a divided length are applied. Consequently, the distance measurement can be efficiently performed in the wide field of view without increasing the size of the chip of the distance measuring sensor.

Moreover, as compared with the conventional arrangement of the line sensors shown in FIG. 15A, in the image pickup apparatus to which the distance measuring device of the third embodiment is applied, the space between the trains of photodetector units can be narrow and the distance measuring area cannot be out of the focal plane even if the photographing magnification is high. As compared with the conventional arrangement of the line sensors shown in FIG. 15B, all spaces between the trains of photodetector units can be narrow and the number of distance measuring areas can be increased in the vertical direction.

Next, a description is given of a distance measuring device according to a fourth embodiment of the present invention.

An image pickup apparatus incorporating the distance measuring device of the fourth embodiment is substantially similar to the image pickup apparatus 1 incorporating the distance measuring device of the first embodiment shown in FIG. 1. However, according to the fourth embodiment, in the image pickup apparatus, particularly, the photographing optical system can be zoomed, the arrangement of line sensors as distance measuring sensors (optical sensors) is different, and the distance measuring areas can be switched on the focal plane in the zoomed statuses.

Figure 13A:
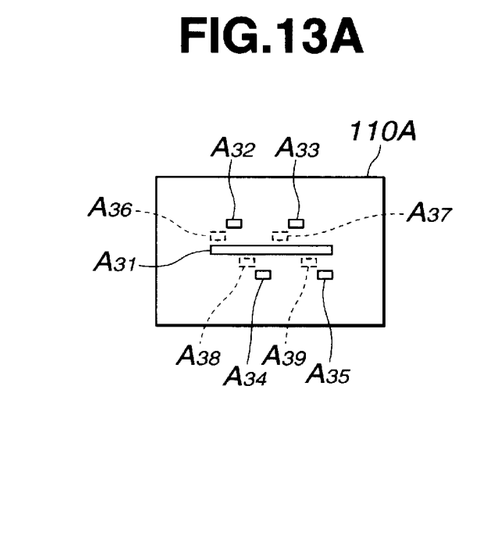
FIG. 13A is a diagram showing distance measuring areas on a focal plane in a wide-zoomed status of zoomed ones in an image pickup apparatus according to a fourth embodiment of the present invention.
Figure 13B:
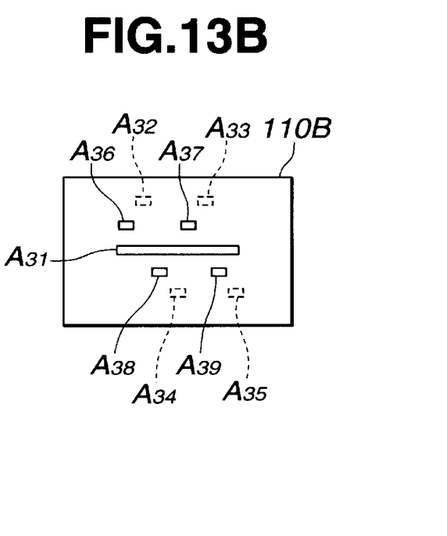
FIG. 13B is a diagram showing distance measuring areas on a focal plane in a tele-zoomed status of the zoom ones in the image pickup apparatus in FIG. 13A according to the fourth embodiment of the present invention.

FIGS. 13A and 13B are diagrams showing distance measuring areas on the focal plane in the zoomed status in the image pickup apparatus to which the distance measuring device of the fourth embodiment is applied, in which FIG. 13A is a diagram showing the distance measuring areas in a wide-zoomed photographing optical system and FIG. 13B is a diagram showing the distance measuring areas in a tele-zoomed photographing optical system.

On a focal plane 110A in the wide-zoomed status in FIG. 13A and a focal plane 110B in the tele-zoomed status in FIG. 13B are set all nine lines of distance measuring areas $A_{31}$ to $A_{39}$. Sets of the nine distance measuring areas are selected by switching zoomed statuses.

That is, on the focal plane 110A in the wide-zoomed status, the distance measuring area $A_{31}$ in the center, distance measuring areas $A_{32}$ and $A_{33}$ above the area $A_{31}$, and distance measuring areas $A_{34}$ and $A_{35}$ having the same spaced distance from the areas $A_{32}$ and $A_{33}$, below the area $A_{31}$. The distance measuring areas $A_{32}$ and $A_{33}$ are spaced from each other by a predetermined distance in the horizontal direction, and a center between the areas $A_{32}$ and $A_{33}$ is shifted to the left from the center of the area $A_{31}$. The distance measuring areas $A_{34}$ and $A_{35}$ are spaced from each other by a predetermined distance in the horizontal direction, and a center between the areas $A_{34}$ and $A_{35}$ is shifted to the right from the center of the area $A_{31}$.

Since the distance measuring areas $A_{36}$, $A_{37}$, $A_{38}$, and $A_{39}$ above and below measuring area $A_{31}$ are extremely close to the center distance measuring area $A_{31}$, they are not effective as the distance measuring areas and are therefore not used as the wide distance-measuring areas, thereby preventing degrading precision of measuring the distance to a main subject.

On the focal plane 110B in the tele-zoomed status, the distance measuring area $A_{31}$ in the center, distance measuring areas $A_{36}$ and $A_{37}$ above the area $A_{31}$, and distance measuring areas $A_{38}$ and $A_{39}$ having the same spaced distance from the areas $A_{36}$ and $A_{37}$, below the area $A_{31}$, are selected. The distance measuring areas $A_{36}$ and $A_{37}$ are spaced from each other by a predetermined distance in the horizontal direction, and a center between the areas $A_{36}$ and $A_{37}$ is shifted to the left from the center of the area $A_{31}$. The distance measuring areas $A_{38}$ and $A_{39}$ are spaced from each other by a predetermined distance in the horizontal direction, and a center between the areas $A_{38}$ and $A_{39}$ is shifted to the right from the center of the area $A_{31}$.

Since the distance measuring areas $A_{32}$ and $A_{33}$ above, and the distance measuring areas $A_{34}$ and $A_{35}$ below, are close to the lower end of the focal plane and are also located at positions to capture subjects other than the main subject, they are not effective as the distance measuring areas and are therefore not used as the distance measuring areas in the tele-zoomed status, thereby preventing degrading the precision of measuring the distance to the main subject.

As described above, in the distance measuring device of the fourth embodiment, the distance measuring area is set by switching the focal plane into one in FIG. 13A or 13B in accordance with the zoomed statuses of the photographing optical system. Consequently, the precision of measuring the distance to the subject cannot be reduced depending on the zoomed statuses.

Figure 14:
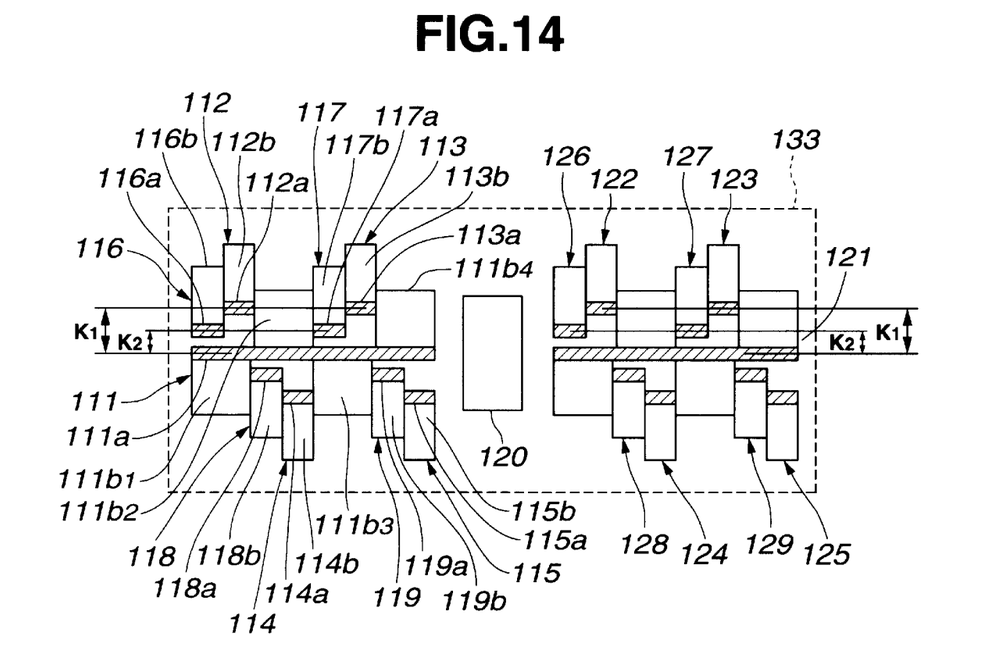
FIG. 14 is a diagram showing an internal arrangement of distance measuring sensors which are applied to the image pickup apparatus in FIGS. 13A and 13B.

Next, a description is given of the configuration of the distance measuring sensor 133 in the distance measuring device of the fourth embodiment by using the internal arrangement of a distance measuring sensor in FIG. 14. For the sake of clear understanding, the arrangement in FIG. 14 corresponds to the distance measuring areas $A_{31}$ to $A_{39}$ shown in FIGS. 13A and 13B. However, actual line sensors are arranged by vertically inverting the above-mentioned line sensors in FIG. 14. A description of the arrangement of the line sensors is given with reference to FIG. 14.

The distance measuring sensor 133 comprises: nine pairs of line sensors 111 and 121, 112 and 122, 113 and 123, 114 and 124, 115 and 125, 116 and 126, 117 and 127, 118 and 128, and 119 and 129, arranged corresponding to the distance measuring areas $A_{31}$ to $A_{39}$, respectively; and a control circuit 120 arranged in a space in the center of the nine pairs of line sensors. The line sensors 111 to 119 and 121 to 129 comprise trains of photodetector units, composed of a plurality of pixels, for receiving light of an image of a subject and trains of processing units for processing and outputting optical charges generated in the trains of photodetector units, respectively.

The line sensor 111 comprises: a train of photodetector units 111a in the center, arranged corresponding to the distance measuring area $A_{31}$ in the center of the focal plane; and trains of processing units 111b₁ to 111b₄, as four divided blocks. The train of photodetector units 11*a* corresponds to the above four divided trains of processing units and is divided into four blocks.

In the line sensor 111, the trains of processing units $111b_1$ to $111b_4$ are arranged at positions corresponding to the four divided blocks of the train of photodetector units 111*a*, i.e., on the lower left, on the upper left, on the lower right, and on the upper right, respectively.

The line sensors 112 and 113 comprise: trains of photodetector units 112*a* and 113*a*; and trains of processing units 112*b* and 113*b*, arranged corresponding to the distance measuring areas $A_{32}$ and $A_{33}$ on the focal plane, respectively.

The trains of photodetector units 112*a* and 113*a* are arranged above the train of photodetector units 111*a* of the line sensor 111 and also on the opposed side of the divided train of processing units $111b_1$ or $111b_3$, and each of them has lengths that is half of those of the divided trains $111b_1$ and $111b_3$. The trains of processing units 112*b* and 113*b* are arranged on the upper side of the trains of photodetector units 112*a* and 113*a*. Since no train of processing units lies between the train of photodetector units 111*a* and the train of photodetector units 112*a* and between the train 111*a* and the train of photodetector units 113*a*, a spaced distance between them can be a desired distance $K_1$. The distance $K_1$ causes the proper arrangement of the distance measuring areas on the focal plane when the focal distance of the photographing optical system is wide.

The line sensors 114 and 115 comprise: trains of photodetector units 114*a* and 115*a*; and trains of processing units 114*b* and 115*b*, arranged corresponding to the distance measuring areas $A_{34}$ and $A_{35}$ on the focal plane.

The trains of photodetector units 114*a* and 115*a* are arranged below the train of photodetector units 111*a* of the line sensor 111 and also on the opposed side of the divided train of processing units $111b_2$ or $111b_4$, and they have half lengths of those of the divided trains $111b_2$ and $111b_4$. The trains of processing units 114*b* and 115*b* are arranged on the lower side of the trains of photodetector units 114*a* and 115*a*. Since no train of processing units lies between the train of photodetector units 111*a* and the train of photodetector units 114*a* and between the train 111*a* and the train of photodetector units 115*a*, a spaced distance between them can be the above-mentioned desired distance $K_1$.

The line sensors 116 and 117 comprise: trains of photodetector units 116*a* and 117*a*; and trains of processing units 116*b* and 117*b*, arranged corresponding to the distance measuring areas $A_{36}$ and $A_{37}$ on the focal plane.

The trains of photodetector units 116*a* and 117*a* are arranged above the train of photodetector units 111*a* of the line sensor 111 and also on the opposed side of the divided train of processing units $111b_1$ or $111b_3$, and have half lengths of those of the divided trains $111b_1$ and $111b_3$. The trains of processing units 116*b* and 117*b* are arranged on the upside of the trains of photodetector units 116*a* and 117*a*. Since no train of processing units lies between the train of photodetector units 111*a* and the train of photodetector units 116*a* and between the train 111*a* and the train of photodetector units 117*a*, a spaced distance between them can be a desired distance $K_2$. However, the distance $K_2$ is shorter than the distance $K_1$ and is the shortest distance to the train of photodetector units 111*a*. When the focal distance of the photographing optical system is tele-zoomed, the distance $K_2$ causes the proper arrangement of the distance measuring areas on the focal plane.

The line sensors 118 and 119 comprise: trains of photodetector units 118*a* and 119*a*; and trains of processing units 118*b* and 119*b*, arranged corresponding to the distance measuring areas $A_{38}$ and $A_{39}$ on the focal plane.

The trains of photodetector units 118*a* and 119*a* are arranged below the train of photodetector units 111*a* of the line sensor 111 and also on the opposed side of the divided train of processing units $111b_2$ or $111b_4$, and each of them has a length of half of those of the divided trains $111b_2$ and $111b_4$. The trains of processing units 118*b* and 119*b* are arranged on the lower side of the trains of photodetector units 118*a* and 119*a*. Since no train of processing units lies between the train of photodetector units 111*a* and the train of photodetector units 118*a* and between the train 111*a* and the train of photodetector units 119*a*, a spaced distance between them can be the above-mentioned desired distance $K_2$.

Incidentally, the line sensors 121 to 129 have the same arrangements of the trains of photodetector units and the trains of processing units as those of the line sensors 111 to 119 as the pairs thereof.

As described above, in the distance measuring device of the fourth embodiment, of the plurality of line sensors, the center line sensor 111 has the train of photodetector units and the train of processing units which is divided into a plurality of blocks on both sides thereof. The trains of photodetector units of other line sensors, corresponding to the divided blocks of the line sensor 111, are arranged to the block-divided trains of photodetector units at the positions opposed to the trains of processing units. Consequently, the above-described arrangement utilizes the arranged spaces efficiently. Further, the space between the trains of photodetector units is varied depending on the block, and the distance measuring areas can be switched and selected in accordance with the zoomed position of the photographing lens. Accordingly, the distance measurement can be efficiently performed without deteriorating its precision.

As compared with the conventional distance measuring device in which the arrangement of a plurality of line sensors having a single length, the number of pixels of the distance measuring sensors can be decreased. Therefore, a time for calculation of distance measurement can be reduced in the CPU 4, and the automatic focusing process is fast, thereby improving the convenience. The distance measurement can be efficiently performed in the wide field of view without the increase in size of the chip of the distance measuring sensor.

Moreover, as compared with the conventional arrangement of the line sensors shown in FIG. 15A, in the image pickup apparatus to which the distance measuring device of the fourth embodiment is applied, the space between the trains of photodetector units can be narrow and the distance measuring area cannot be out of the focal plane even if the photographing magnification is high. As compared with the conventional arrangement of the line sensors shown in FIG. 15B, all spaces between the trains of photodetector units can be narrow and the number of distance measuring areas can be increased in the vertical direction.

Limited to the line sensor in the center of the distance measuring sensors is not limited to a line sensor having the trains of photodetector units and processing units to be divided into a plurality of blocks which is applied to the distance measuring sensors in the first to fourth embodiments. It may be one arranged on the upside or downside.

As described above, according to the first to fourth embodiments of the present invention, in the distance measuring device having the distance measuring sensor having a plurality of pairs of line sensors, the distance measuring areas can be properly arranged even if the photographing magnification is high or if the distance measuring optical system is miniaturized. It is possible to provide the distance measuring sensor or distance measuring device for measuring the distance to the subject with more accuracy. Since the number of pixels of the distance measuring sensor is decreased, the time for calculation of distance measurement is reduced. It is possible to provide the distance measuring sensor or distance measuring device in which the time-lag is short for the automatic focusing process of the camera, thereby improving the convenience.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A distance measuring device, comprising:
   an optical system for dividing an image of a subject and forming the image; and
   a plurality of line sensors arranged substantially onto an image forming plane of said optical system, each of said line sensors comprising a train of photodetector units and a train of processing units, said train of photodetector units being composed of a plurality of pixels for receiving light of said image of the subject passing through said optical system, said train of processing units for processing and outputting a charge generated in said train of photodetector units,
   wherein at least one of said plurality of line sensors, as a first line sensor, divides said train of photodetector units into a plurality of blocks, and of said train of processing units corresponding to each of said blocks, one part of said train of processing units is arranged to one side of said train of photodetector units and the other part of said train of processing units is arranged to the other side to sandwich said train of photodetector units, and
   wherein each of the plurality of blocks has more than one pixel.

2. A device according to claim 1, wherein, the train of photodetector units of a second line sensor, different from said first line sensor, is arranged at an opposed position of said train of processing units.

3. A device according to claim 2, wherein a space between said train of photodetector units of the first line sensor and said train of photodetector units of said second line sensor is varied depending on said second line sensor.

4. A device according to claim 1, wherein said first line sensor corresponds to a distance measuring area substantially in the center of a focal plane.

5. A device according to claim 1, wherein said trains of processing unit are alternatively arranged every block to sandwich said train of photodetector units of the first line sensor.

6. A device according to claim 1, wherein a length to divide said train of photodetector units of the first line sensor into a plurality of blocks is varied depending on the block.

7. A device according to claim 1, further comprising:
   a control unit for controlling an operation of said first line sensor and forming a signal on a distance to said subject based on an output of said first line sensor.

8. An optical sensor, comprising:
   a plurality line sensors, each of said line sensors comprising a train of photodetector units and a train of processing units, said train of photodetector units being composed of a plurality of pixels for receiving light of said image of the subject passing through said optical system, said train of processing units for processing and outputting a charge generated in said train of photodetector units,
   wherein at least one of said plurality of the line sensors, as a first line sensor, divides said train of photodetector units into a plurality of blocks, and of said train of processing units corresponding to each of said blocks, one part of said train of processing units is arranged to one side of said train of photodetector units and the other part of said train of processing units is arranged to the other side to sandwich said train of photodetector units, and
   wherein each of the plurality of blocks has more than one pixel.

9. A sensor according to claim 8, wherein, sequentially to said train of photodetector units, the train of photodetector units of a second line sensor, different from said first line sensor, is arranged at an opposed position of said train of processing units.

10. A sensor according to claim 9, wherein a space between said train of photodetector units of the first line sensor and said train of photodetector units of said second line sensor is varied depending on said second line sensor.

11. A sensor according to claim 8, wherein said first line sensor corresponds to a distance measuring area substantially in the center of a focal plane.

12. A sensor according to claim 8, wherein said trains of processing units are alternately arranged every block to sandwich said train of photodetector units of the first line sensor.

13. A sensor according to claim 8, wherein a length to divide said train of photodetector units of the first line sensor into a plurality of blocks is varied depending on the block.

14. A sensor according to claim 8, wherein said sensor is a CMOS sensor.

15. A sensor according to claim 8, wherein said sensor is a CCD.

16. A camera having a distance measuring device, comprising:
   an image pickup optical system;
   a drive unit for driving said image pickup optical system in an optical axis direction;
   an image pickup unit for photographing an image of a subject which is formed through said image pickup optical system;
   a distance measuring optical system for dividing the image of the subject and forming the image;
   a plurality line sensors, each of said line sensors comprising a train of photodetector units and a train of processing units, said train of photodetector units being composed of a plurality of pixels for receiving light of said image of the subject passing through said optical system, said train of processing units for processing and outputting a charge generated in said train of photodetector units; and
   a control unit for controlling an operation of said drive unit based on outputs of said line sensors so that said image of the subject is formed onto a focal plane of said image pickup unit,
   wherein at least one of said plurality of line sensors, as a first line sensor, divides said train of photodetector units into a plurality of blocks, and of said train of processing units corresponding to each of said blocks, one part of said train of processing units is arranged to one side of said train of photodetector units and the other part of said train of processing units is arranged to the other side to sandwich said train of photodetector units, and wherein each of the plurality of blocks has more than one pixel.

17. A camera according to claim 16, wherein the train of photodetector units of a second line sensor, different from said first line sensor, is arranged at an opposed position of said train of processing units.

18. A camera according to claim 17, wherein a space between said train of photodetector units of the first line sensor and said train of photodetector units of said second line sensor is varied depending on said second line sensor.

19. A camera according to claim 16, wherein said first line sensor corresponds to a distance measuring area substantially in the center of a focal plane.

20. A camera according to claim 16, wherein said trains of processing unit are alternatively arranged every block to sandwich said train of photodetector units of the first line sensor.

21. A camera according to claim 16, wherein a length to divide said train of photodetector units of the first line sensor into a plurality of blocks is varied depending on the block.

22. A camera according to claim 16, wherein said image pickup unit is a silver-halide film.

23. A camera according to claim 16, wherein said image pickup unit is an image pickup element.

24. A camera according to claim 16, wherein said image pickup optical system is a zoom optical system capable of changing a focal distance.

25. A camera according to claim 24, wherein said control unit selectively switches said line sensors used for control of said drive unit in accordance with the focal distance of said image pickup optical system.

26. A camera according to claim 24, wherein said camera switches a distance measuring area on the focal plane in accordance with the focal distance of said image pickup optical system.

27. A camera according to claim 16, further comprising:
a nonvolatile memory for storing therein correction data which is used by said control unit when controlling the operation of said drive unit.

28. A distance measuring device, comprising:
image forming means for dividing an image of a subject and forming the image; and
a plurality of photodetector means arranged substantially onto an image forming plane of said image forming means, each of said photodetector means comprising a train of photodetector units and a train of processing units, said train of photodetector units being composed of a plurality of pixels for receiving light of said image of the subject passing through said image forming means, said train of processing units for processing and outputting a charge generated in said train of photodetector units,
wherein at least one of said plurality of photodetector means divides said train of photodetector units into a plurality of blocks, and of said train of processing units corresponding to each of said blocks, one part of said train of processing units is arranged to one side of said train of photodetector units and the other part of said train of processing units is arranged to the other side to sandwich said train of photodetector units, and
wherein each of the plurality of blocks has more than one pixel.

29. An optical system, comprising:
a pair of a group of line sensors, each of said line sensors comprising a train of photodetector units and a train of processing units, said train of photodetector units being composed of a plurality of pixels for receiving light of said image of the subject passing through said optical system, said train of processing units for processing and outputting a charge generated in said train of photodetector units,
wherein each of the groups of line sensors include at least a first line sensor and a second line sensor located above or below the first line sensor and offset to a side of a center of the first line sensor.

30. An optical system, comprising:
a pair of a group of line sensors, each of said line sensors comprising a train of photodetector units and a train of processing units, said train of photodetector units being composed of a plurality of pixels for receiving light of said image of the subject passing through said optical system, said train of processing units for processing and outputting a charge generated in said train of photodetector units,
wherein each of the group of line sensors includes at least a first line sensor having a first length and a second line sensor located above or below the first line sensor and having a second length which is shorter than the first length of the first line sensor.

31. An optical system, comprising:
a plurality of line sensors, each of said line sensors comprising a train of photodetector units and a train of processing units, said train of photodetector units being composed of a plurality of pixels for receiving light of said image of the subject passing through said optical system, said train of processing units for processing and outputting a charge generated in said train of photodetector units,
wherein a first sensor includes a train of photodetector units and trains of processing units on opposing sides of the train of photodetector units, and wherein a second sensor includes another train of photodetector units adjacent to at least a part of the train of photodetector units of the first sensor, with no processing units interposed between the trains of photodetector units of the first and second sensors.

32. An optical system, comprising:
a pair of a group of line sensors, each of said line sensors comprising a train of photodetector units and a train of processing units, said train of photodetector units being composed of a plurality of pixels for receiving light of said image of the subject passing through said optical system, said train of processing units for processing and outputting a charge generated in said train of photodetector units,
wherein each of the group of line sensors includes at least a first line sensor, a first group of one or more line sensors above the first line sensor, and a second group of one or more line sensors above or below the first line sensor, wherein the first group of line sensors has more line sensors than the second line sensor.

* * * * *